United States Patent
Artelsmair

(10) Patent No.: US 11,992,905 B2
(45) Date of Patent: May 28, 2024

(54) METHOD FOR ASCERTAINING THE WEAR OF A CONTACT TUBE DURING A ROBOT-SUPPORTED WELDING METHOD

(71) Applicant: Fronius International GmbH, Pettenbach (AT)

(72) Inventor: Josef Artelsmair, Pettenbach (AT)

(73) Assignee: Fronius International GmbH, Pettenbach (AT)

(*) Notice: Subject to any disclaimer, the term of this patent is extended or adjusted under 35 U.S.C. 154(b) by 0 days.

(21) Appl. No.: 17/767,754

(22) PCT Filed: May 18, 2021

(86) PCT No.: PCT/EP2021/063102
§ 371 (c)(1),
(2) Date: Apr. 25, 2023

(87) PCT Pub. No.: WO2021/233891
PCT Pub. Date: Nov. 25, 2021

(65) Prior Publication Data
US 2023/0271266 A1    Aug. 31, 2023

(30) Foreign Application Priority Data
May 19, 2020    (EP) .................................... 20175411

(51) Int. Cl.
*B23K 9/12* (2006.01)
*B23K 9/095* (2006.01)
*G01N 27/04* (2006.01)

(52) U.S. Cl.
CPC .............. *B23K 9/123* (2013.01); *B23K 9/095* (2013.01); *G01N 27/041* (2013.01)

(58) Field of Classification Search
CPC ........ B23K 9/09; B23K 9/095; B23K 9/0953; B23K 9/123; B23K 9/173; B23K 9/295; G01N 27/041
See application file for complete search history.

(56) References Cited

U.S. PATENT DOCUMENTS 6,130,407 A  * 10/2000  Villafuerte ........... B23K 9/0956
                                                    219/130.01
6,639,181 B2    10/2003  Suzuki et al.
(Continued)

FOREIGN PATENT DOCUMENTS

CN       101932405 A       12/2010
CN       103282153 A        9/2013
(Continued)

OTHER PUBLICATIONS

International Search Report in PCT/EP2021/063102, mailed Oct. 1, 2021.

(Continued)

*Primary Examiner* — Jay Patidar
(74) *Attorney, Agent, or Firm* — Collard & Roe, P.C.

(57) ABSTRACT

A method for ascertaining the wear of a contact tube during a robot-assisted welding method on a workpiece using a welding torch with a consumable welding wire includes the steps of measuring a welding current, measuring a welding voltage, dividing the welding current so measured by the welding voltage so measured to calculate a conductance value and comparing the conductance value with at least one defined conductance threshold value or dividing the welding voltage so measured by the welding current so measured to calculate a resistance value and comparing the resistance value with at least one defined resistance threshold value, and issuing a warning when at least one of the conductance value equals the at least one defined conductance threshold (Continued)

Figure 1:
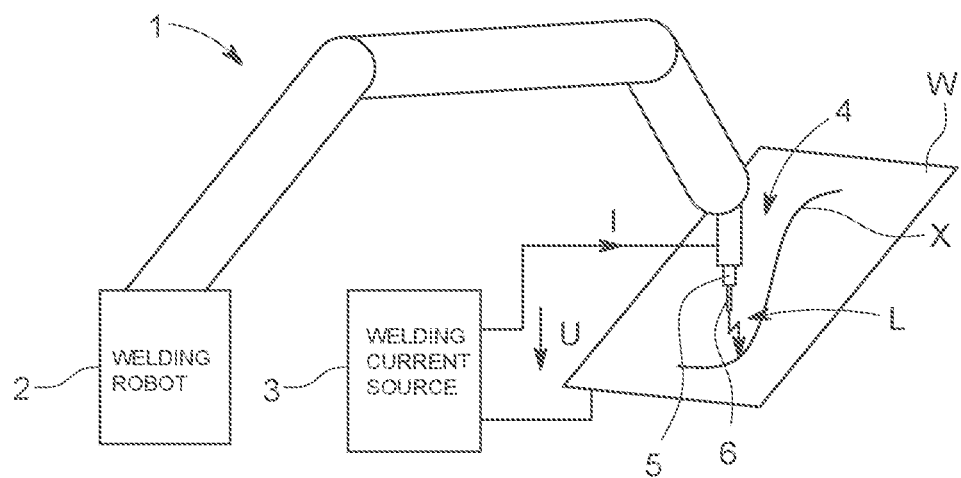

value and the resistance value equals the at least one defined resistance threshold value.

11 Claims, 3 Drawing Sheets

(56) References Cited

U.S. PATENT DOCUMENTS

| | | | |
|---|---|---|---|
| 8,309,887 B2 | 11/2012 | Yamamto et al. | |
| 9,833,857 B2 | 12/2017 | Artelsmair | |
| 10,537,954 B2 | 1/2020 | Daniel | |
| 2003/0029851 A1* | 2/2003 | Suzuki | B23K 9/26 219/130.01 |
| 2008/0245775 A1 | 10/2008 | Opderbecke et al. | |
| 2011/0006045 A1* | 1/2011 | Yamamoto | B23K 9/26 219/136 |
| 2012/0234813 A1* | 9/2012 | Ryan | B23K 9/095 219/137 R |
| 2012/0234816 A1 | 9/2012 | Petrenko et al. | |
| 2020/0306859 A1* | 10/2020 | Fleming | B23K 9/1006 |

FOREIGN PATENT DOCUMENTS

| | | |
|---|---|---|
| DE | 259162 A1 | 8/1988 |
| EP | 1 283 088 A1 | 2/2003 |
| EP | 2 925 476 B1 | 10/2017 |
| EP | 2 686 129 B1 | 7/2018 |
| EP | 2 480 368 B1 | 7/2020 |
| IN | 101152681 A | 4/2008 |
| JP | 2003-053547 A | 2/2003 |
| JP | 3206212 U | 9/2016 |
| JP | 2018-158382 A | 10/2018 |
| WO | 2015/059533 A1 | 4/2015 |

OTHER PUBLICATIONS

European Search Report in EP 20175411.6-1016, dated Nov. 19, 2020.
Japanese Office Action in Japanese Patent Application No. 2022-518391 mailed Feb. 28, 2023 with English translation.
Chinese Office Action in Chinese Patent Application No. 202180006168.1 dated Feb. 15, 2023 with translation of relevant parts.
English translation of International Preliminary Report on Patentability in PCT/EP2021/063102, dated Jan. 3, 2022.
Decision of Refusal in Japanese Patent Application No. 2022-518391 dated Jul. 4, 2023 with translation and summary.

* cited by examiner

METHOD FOR ASCERTAINING THE WEAR OF A CONTACT TUBE DURING A ROBOT-SUPPORTED WELDING METHOD

CROSS REFERENCE TO RELATED APPLICATIONS

This application is the National Stage of PCT/EP2021/063102 filed on May 18, 2021, which claims priority under 35 U.S.C. § 119 of European Application No. 20175411.6 filed on May 19, 2020, the disclosure of which is incorporated by reference. The international application under PCT article 21 (2) was not published in English.

The invention relates to a method for ascertaining the wear of a contact tube during a robot-supported welding method on a workpiece using a welding torch with a consumable welding wire, in which the welding current is measured and the wear of the contact tube is determined via the measured welding current.

In welding methods using a consumable welding wire, in particular MIG (metal inert-gas) and MAG (metal active-gas) welding, wear can occur over time on the contact tube which is used to move the welding wire towards the welding seam and in which the welding current that forms the arc is transferred. Due to the friction between the welding wire and contact tube, the contact point at which the current transfer to the welding wire takes place gradually migrates from the end of the contact tube, where the welding wire exits the contact tube, in the direction of the attachment of the contact tube to the welding torch. If the welding current is not reduced or the wire feed rate is increased, this results in a lengthening of the arc at a constant distance between the end of the contact tube, where the welding wire exits, and the surface of the workpiece. The resulting length of the current-passing part of the welding wire, i.e. from the contact point in the contact tube where the current passes into the welding wire to the start of the arc where the welding wire melts, depends on the material, the diameter and the feed rate of the welding wire and the amplitude of the welding current. This changes the arc length, i.e. the distance from the end of the welding wire to the workpiece, for a constant current flow through the welding wire. To keep this distance constant, the welding current and/or the wire feed and/or the distance to the end of the contact tube can be changed. This can compensate to a certain extent for the wear of the contact tube, i.e. the displacement of the contact point in the contact tube. The worn contact tube must then be replaced in order to continue the welding process.

In some welding methods, such as deposition welding (cladding), constant welding parameters are particularly important to ensure a constant thickness of the layer to be applied and constant melting of the base material, and thus a constant welding quality.

The patent EP 1 283 088 A1 describes a method for ascertaining the wear of a contact tube in a welding method, wherein the welding voltage and the welding current are measured and a replacement index is calculated from the average values of the measurements. If this replacement index reaches a certain reference value, it is indicated that the contact tube should be replaced.

Document EP 2 686 129 B1 describes a method for monitoring the wear of a contact tube in real time, wherein the average values of the welding current in relation to the number of welded joints are monitored and displayed. As the duration of the welding process increases, the average welding current value decreases as a result of the contact point between the contact tube and welding wire migrating backwards toward the welding torch. If the average welding current value falls below predetermined limits, a corresponding warning is issued. In welding methods in which the welding current is regulated to a constant value, the welding current cannot be used to indicate the wear of the contact tube.

The object of the present invention consists in creating an above-mentioned method for ascertaining the wear of a contact tube, which provides more reliable information as to the actual wear of the contact tube independently of the regulated variables for maintaining the arc length constant, and indicates as precisely as possible when the contact tube should be replaced. The method is designed to be implemented as simply and cost-effectively as possible. Disadvantages of the prior art are to be reduced or prevented.

This object is achieved by expressing the measured welding current as a ratio of the measured welding voltage, and using the ratio of the welding current to the welding voltage for assessing the wear of the contact tube by comparison with at least one defined threshold value, and by issuing a warning when at least one defined threshold value is reached. Expressing the welding current as a ratio of the welding voltage means that the conductance or resistance of the arc is used to assess the wear of the contact tube. This allows a more reliable parameter to be found for the assessment of the wear of the contact tube, one which is independent of the above-mentioned control variables for regulating the arc length. Because the welding current and the welding voltage in a welding process are recorded anyway, the effort required to implement this method is very low and only requires the associated programming of the control device of the welding device. Since the voltage cannot be measured directly on the arc because it is not possible to take a measurement at the end of the welding wire, the voltage is measured inclusive of the voltage drop in the current-passing welding wire end. The welding current is the same everywhere in the welding circuit (welding wire, arc, etc.). Therefore, the ratio of welding current to welding voltage is not directly equal to the resistance or conductance of the arc. However, for ascertaining the degree of wear of the contact tube it is irrelevant where the welding voltage is measured, since it is not the absolute value of the resistance or conductance but the change in their values that is evaluated over the welding period. Therefore, the welding voltage can be measured at the output terminals of the current source or directly between the contact tube and the ground connection on the workpiece, or at any other point along the welding conductors. The novel method allows the wear of the contact tube to be indicated to the user in a timely and reliable manner regardless of the arc control method used (welding current, wire feed rate and/or distance) and the contact tube to be replaced in good time, with the result that the welding process can be continued with high quality.

The measurement of the welding current and the welding voltage is preferably performed at a time when the welding current has a maximum value, in order to be able to determine the ratio, i.e. the resistance or the conductance, as accurately as possible. In a pulsed process, the highest current value usually occurs after an ascending current ramp at the end of the pulse phase. At this point, the voltage drops across the welding circuit inductance tend to zero, because the current rate of change $di/dt=0$. Thus, the ideal measurement time is the point at which the maximum current level has set in. From this point, an averaging of multiple measurement values recorded over a period of time beforehand can be performed (see below). The time at which the maximum welding current occurs is also optimal for other welding processes, such as short-circuit-based arc welding processes. The maximum welding current during an arc phase usually occurs after the end of a short-circuit phase. The measurement can be triggered by the short-circuit at the ideal time, i.e. a specified time interval after the short-circuit has been triggered, or if no short-circuit is detected within a specified time window, in a cyclically recurring manner at predefined time intervals.

According to another feature of the invention, the ratio of the measured welding current to the measured welding voltage is averaged over time. This allows the signal to be smoothed accordingly and prevents incorrect evaluation of the wear of the contact tube due to individual outliers.

Preferably, the measured welding current is divided by the measured welding voltage and a conductance is formed, and the conductance is compared with at least one defined conductance threshold value and the warning is issued when the at least one defined conductance threshold value is reached. The calculated conductance of the arc decreases with progressive wear of the contact tube, which means that the wear of the contact tube can be reliably indicated by the conductance falling below a predefined threshold value. Of course, by providing or defining multiple threshold values for the conductance, the changes in the wear can also be indicated in a graduated manner. For example, by defining a first, upper threshold for the conductance a first, incipient level of wear of the contact tube can be indicated and communicated, a second, medium threshold for the conductance can indicate and communicate a progressive level of wear of the contact tube, and a third, lower threshold for the conductance can indicate and communicate an impermissible level wear of the contact tube and the mandatory replacement of the same. The individual d defined thresholds are therefore used to generate messages when the predefined wear levels of the contact tube are reached.

Likewise, the measured welding voltage can also be divided by the measured welding current to obtain a resistance and the resistance can be compared with at least one defined resistance threshold, and the warning can be issued when the at least one defined resistance threshold is reached. As in the case of the conductance, here the presence of wear on the contact tube is indicated if at least one defined threshold for the resistance is exceeded.

Advantageously, the at least one defined threshold value of the conductance or resistance can be set or input. This allows the specification of the wear limits of the contact tube to be optimally adjusted on the basis of experience or depending on the respective welding method. For example, the wear limits can be set or input to smaller or lower values when manufacturing workpieces with particularly high quality requirements than when manufacturing workpieces with lower quality requirements.

The warning can be issued acoustically, visually, and or in tactile form. This means that the wear of the contact tube can be appropriately communicated to the welder or a higher-level control centre during the welding process. When multiple thresholds are defined, the respective warning signal can be changed to indicate the wear of the contact tube in a graduated manner. For example, the volume or frequency of an acoustic warning signal, the colour of an optical warning signal, or the intensity of a tactile warning signal can signal the degree of wear of the contact tube.

Advantageously, in the event of a warning being issued, the distance from the welding torch or the end of the contact tube to the workpiece is reduced, thereby compensating for the wear of the contact tube. In this way, the welding process can be continued for a certain period of time with an essentially constant welding quality and the welding time and service life of the contact tube can be increased. Thus, the conductance or resistance can be used for the distance regulation in the robot controller by using the defined threshold values for the wear limits to adjust the actual value of the distance from the welding torch or contact tube to the workpiece. The last threshold value as the last wear limit defines the minimum distance for the distance regulation, while at the same time indicating the necessary replacement of the contact tube.

If the distance from the welding torch or the end of the contact tube to the workpiece is also ascertained during the welding process, it is possible to indicate whether the welding torch is positioned too close to the workpiece. The distance can be determined using a wide range of methods, such as optical methods.

If, according to another feature of the invention, a weld is carried out on a reference metal plate in the event of a warning being issued, the assessment of the wear of the contact tube can be further improved and checked very accurately using the ratio between the welding current and the welding voltage. The reference weld can be used to verify whether the actual free welding wire length has changed due to wear of the contact tube. This is advantageous in so far as the reference weld is not subject to the tolerances of the contact tube distance, as may be the case for the welding seams on the workpiece.

Advantageously, the welding current and the welding voltage are measured with a sampling frequency of 10 kHz to 100 kHz. Such values have proved to be suitable for providing a sufficiently high measurement accuracy and a limited processing effort.

Preferably, the welding current and the welding voltage are averaged over a period of 1 ms to 300 ms. Such averaging intervals can prevent or reduce false measurement results due to outliers.

If the ratio of the welding current to the welding voltage is recorded or stored as a function of the position of a welding path during the welding process and/or as a function of the welding period of the welding method, the data can be provided for documentation purposes.

Figure 2A:
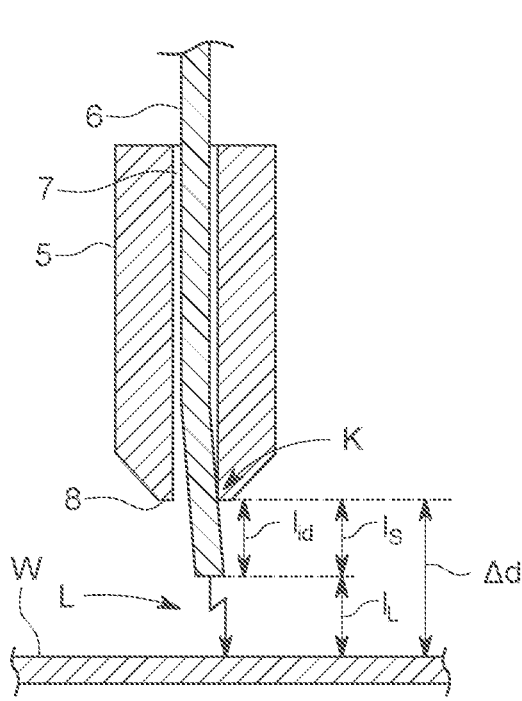
Figure 2B:
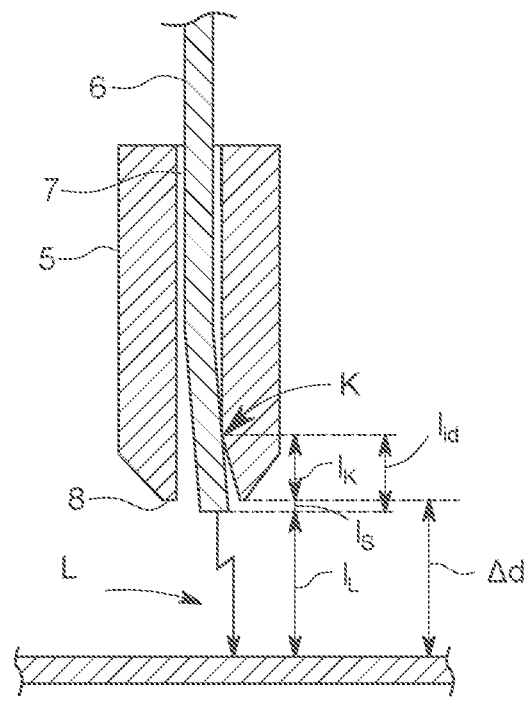
Figure 3:
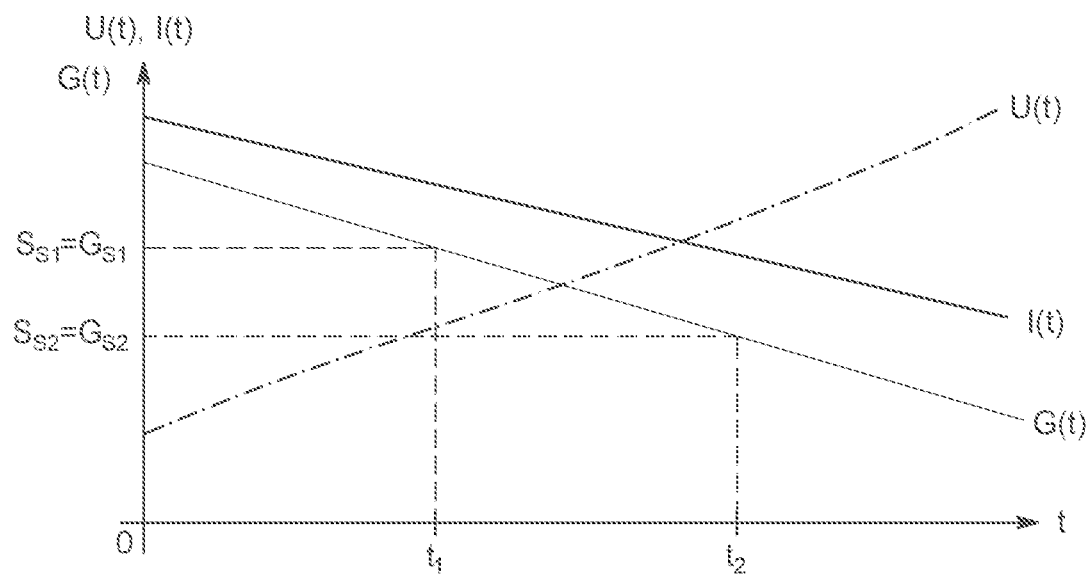
Figure 4:
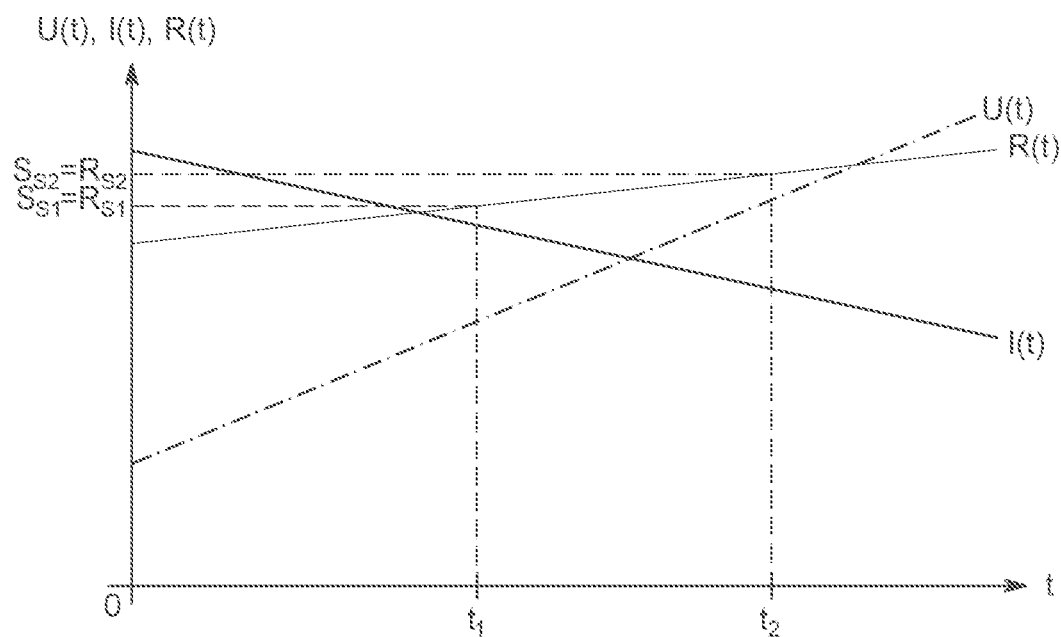
Figure 5:
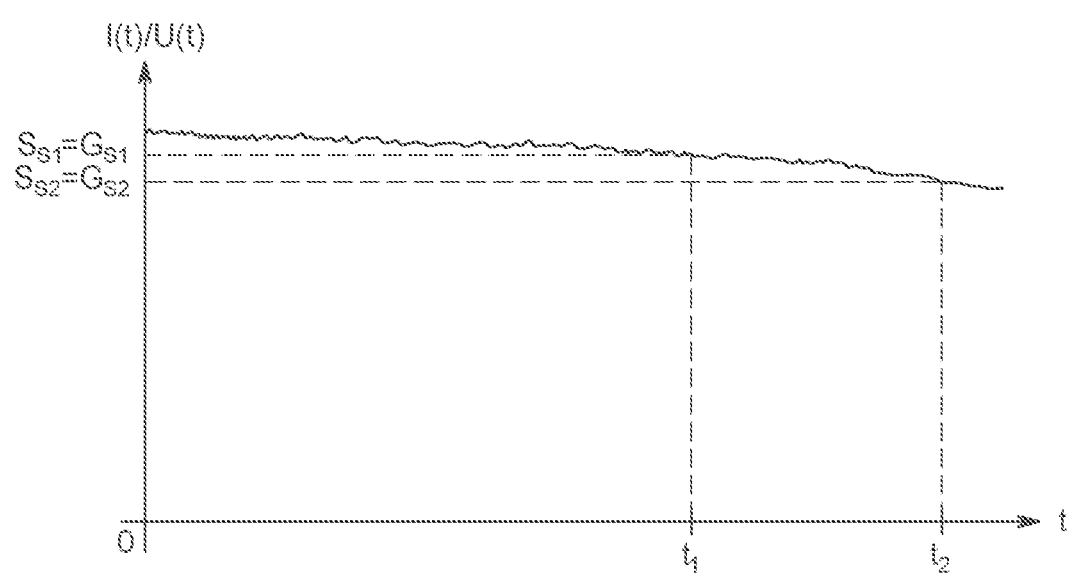

The present invention will be explained in further detail by reference to the attached drawings. These show:

FIG. 1 a block diagram of a welding device for carrying out a welding process with a consumable welding wire;

FIG. 2A a schematic cross-sectional view through a new contact tube;

FIG. 2B a schematic cross-section through a worn contact tube;

FIG. 3 an example of the schematic temporal waveforms of the welding current, the welding voltage, and the ratio of the welding current to the welding voltage, i.e. the conductance;

FIG. 4 an example of the schematic temporal waveforms of the welding current, the welding voltage, and the ratio of the welding voltage to the welding current, i.e. the resistance; and FIG. 5 an example of a real ratio of the welding current to the welding voltage as a function of the time or the welding duration.

FIG. 1 shows a block diagram of a welding device 1 for carrying out a welding process with consumable welding wire 6, wherein a welding robot 2 guides a welding torch 4 along a predefined welding path X over at least one workpiece W to be processed. The consumable welding wire 6 is conveyed to the workpiece W via a contact tube 5 in the welding torch 4. In the contact tube 5, the welding current I supplied by the welding current source 3 is passed into the welding wire 6, so that an arc L to the workpiece W burns at the end of the wire that protrudes from the contact tube 5 during the welding process.

FIG. 2A shows a schematic cross-sectional view through a new contact tube 5. The consumable welding wire 6 is conveyed through a corresponding hole 7 in the contact tube 5. In the case of a new contact tube 5, the hole 7 is essentially cylindrical, so that the contact with the welding wire 6 takes place close to the end 8 of the contact tube 5 at which the welding wire 6 exits the contact tube 5. The contact point K is thus located at the opening or the end 8 of the contact tube 5. The length $l_{id}$ of the current-passing part of the welding wire 6 corresponds here to the free wire length $l_s$, i.e. the length of the welding wire 6 from the end 8 of the contact tube 5 to the end of the welding wire 6. The resulting length $l_{id}$ of the current-passing part of the welding wire 6 (from the contact point K to the end of the welding wire 6 at which the arc begins) depends on the material, diameter, feed rate of the welding wire 6, and also on the welding current I flowing through the welding wire 6. The feed rate of the welding wire 6 and the welding current I are usually adjusted in such a way that a desired length $l_{id}$ of the current-passing welding wire 6 is obtained. The distance Δd from the welding torch 4 or the end 8 of the contact tube 5 to the workpiece W is chosen in such a way that the distance $l_L$ from the end of the welding wire 6 to the workpiece W is suitable for forming the arc L and a stable welding process can take place. To keep the distance $l_L$ constant, the parameters such as the feed rate of the welding wire 6 and/or the welding current I, as well as the distance Δd from the welding torch 4 to the workpiece W, can be varied.

FIG. 2B shows a schematic cross-section through a worn contact tube 5. In the worn contact tube 5, the hole 7 is widened because the permanent current transfer from the contact point K of the contact tube 5 into the welding wire 6 continuously abrades material from the contact tube 5. Thus, the contacting to the welding wire 6 takes place further back. The contact point K here is thus located behind the end 8 of the contact tube 5 at the distance $l_K$ from the end 8 of the contact tube 5. Without changing the feed rate of the welding wire 6 and/or the welding current I, the length $l_{id}$ of the current-passing welding wire 6 remains the same as in the example according to FIG. 2A and the free wire length $l_s$ is thus shortened compared to FIG. 2A. Thus, the distance $l_L$ from the melted end of the welding wire 6 to the surface of the workpiece W is increased compared to FIG. 2A by the distance $l_K$ from the contact point K to the end 8 of the contact tube 5, and the arc L burning between the end of the welding wire 6 and workpiece W is extended by this distance $l_K$ from the end 8 of the contact tube 5. This degrades the welding characteristics, and the distance $l_L$ must therefore be shortened again to the length according to FIG. 2A.

A length of the arc L or the distance $l_L$ is usually reduced by the following three regulation methods (A, B, C), which can be used individually or in combination to compensate for the wear of the contact tube 5, wherein in method A the length $l_{id}$ of the current-passing welding wire 6 remains unchanged and in methods B and C it is increased:

A.) By reducing the distance Δd from the welding torch 4 or the end 8 of the contact tube 5 to the workpiece W by means of a corresponding movement of the welding torch 4 using the welding robot 2. In this case the length $l_{id}$ of the current-passing welding wire 6 and the welding current I and also the feed rate of the welding wire 6 remain unchanged. The advantage of this is that the cross-section of the weld seam and the amount of the base material consumed remain essentially constant.

B.) By increasing the feed rate of the welding wire 6. The length $l_{id}$ of the current-passing welding wire 6 and the free wire length $l_s$ are increased by the distance $l_K$ from the wire length $l_s$ to the end 8 of the contact tube 5. The distance Δd from the welding torch 4 to the workpiece W remains unchanged. This method causes a slight increase in the cross-section of the weld seam. The feed rate of the welding wire 6 is controlled or regulated by the current source 3. The advantage of this method is that the welding robot 2 does not need to execute any movement if the contact point K in the contact tube 5 changes and the amount of the base material consumed remains essentially the same, as the welding current I remains unchanged.

C.) By reducing the welding current I. As with method B.), this causes the length $l_{id}$ of the current-passing welding wire 6 and the free wire length $l_s$ to increase by the distance $l_K$ from the contact point K to the end 8 of the contact tube 5. The distance Δd remains unchanged. The reduction of the welding current I results in a reduction of the amount of the base material consumed (lower penetration depth). The advantage is that the welding robot 2 does not have to perform any movement if the contact point K in the contact tube 5 changes and that the cross-section of the weld seam remains essentially the same, since the feed rate of the welding wire 6 remains unchanged.

If the wear of the contact tube 5 progresses further, the contact point K moves further backwards. In accordance with the limits of the control variables of the methods A.), B.) and C.) described above, replacement of the contact tube 5 will be required. According to the invention, this is possible by specifying the resistance R or conductance G derived from the averaged magnitudes of the welding current I and welding voltage U, irrespective of the combination of the control variables according to methods A.), B.) or C.).

FIG. 3 shows an example of the schematic temporal waveforms of the welding current I(t), the welding voltage U(t) and the ratio of the welding current I(t) to the welding voltage U(t), i.e. the conductance G(t) or the reciprocal resistance 1/R(t), in a welding process for a consumable welding wire. The figures shows the changes in the actual values of the welding current I(t) and the welding voltage U(t) and the magnitude of the conductance value G(t) derived from them, which occur, for example, due to a change in the contact point K in the contact tube 5 by a certain distance, e.g. 6 mm. For the sake of simplification, it was assumed that the wear-related change in the contact point K in the contact tube 5 is linear. In practice, this is usually not the case, but in fact the contact point K of a contact tube 5 normally changes faster at first and then more slowly during the welding process, resulting in a non-linear relationship.

At time t=0 the contact tube 5 is new, the contact point K is very close to the end 8 of the contact tube 5 (see FIG. 2A) and the welding process is carried out with a certain welding voltage U and a certain welding current I. With progressive duration of the arc burn and thus progressive wear of the contact tube 5, a displacement of the contact point K occurs and the welding voltage U increases while the welding current I decreases, when a voltage regulation with a falling characteristic is used (i.e. the welding voltage U is not absolutely constant, but rises with an increase in the resistance R, which means that the welding current I does not drop as much as would be the case if a constant voltage regulation was used). The actual waveforms are dependent on many conditions and factors, such as the particular welding process, the control characteristic, the welding power, the wire material, the contact tube quality, etc. According to the invention, the measured welding current I is divided by the measured welding voltage U and a conductance G is obtained. This conductance G decreases with increasing wear of the contact tube 5, regardless of the form (characteristic) of the regulation of the arc length (constant voltage, constant current, falling, . . . ).

To define threshold values $S_{si}$, which indicate the degree of wear of the contact tube 5, reference welds are performed with a new contact tube using a reference weld seam with different distances Δd. The different distances Δd are used to simulate the degree of wear of the contact tube 5 and to record the measured values or mean values of the welding current I and the welding voltage U and their ratios. At the end of each reference weld with the different distances Δd, these are defined as threshold values $S_{si}$.

In the example shown according to FIG. 3, two conductance thresholds $G_{si}$ are defined, with which the currently determined conductance value G(t) is compared. The first conductance threshold value $G_{S1}$ corresponds to a medium level of wear of the contact tube 5, in which case the welding process can still be continued. This means that when the conductance reaches or falls below the first conductance threshold value $G_{S1}$, a warning is issued at time $t_1$. The second conductance threshold $G_{S2}$ corresponds to a severe level of wear of the contact tube 5, in which case the welding process must no longer be continued. Thus, when the conductance reaches or falls below the second conductance threshold value $G_{S2}$, a more urgent warning or even a shutdown of the welding process occurs at time $t_2$.

FIG. 4 shows the example of the schematic temporal waveforms of the welding current I, the welding voltage U, and the ratio of the welding voltage U to the welding current I, i.e. the resistance R.

At time t=0 the contact tube 5 is new, the contact point K of the contact tube 5 is very close to the end 8 of the contact tube 5 (see FIG. 2A) and the welding process is carried out with a certain welding voltage U and a certain welding current I. As the arc burning duration progresses and hence the contact tube 5 wear increases, a displacement of the contact point K occurs and the welding voltage U increases and the welding current I decreases, if a voltage regulation with a falling characteristic is used. According to the invention, the measured welding voltage U is divided by the measured welding current I and a resistance R is obtained. This resistance R increases with increasing wear of the contact tube 5 regardless of the form of regulation of the arc length (characteristic).

In the example shown according to FIG. 4, two resistance thresholds $R_{si}$ are defined, with which the currently determined resistance R(t) is compared. The first resistance threshold value $R_{S1}$ corresponds to a medium level of wear of the contact tube 5, in which case the welding process can still be continued. This means that when the resistance reaches or exceeds the first resistance threshold value $R_{S1}$, a warning is issued at time $t_1$. The second resistance threshold $R_{S2}$ corresponds to a severe level of wear of the contact tube 5, in which case the welding process can no longer be continued. Thus, when the resistance reaches or exceeds the second resistance threshold value $R_{S2}$, a more urgent warning is issued, or even a shutdown of the welding process occurs at time $t_2$.

FIG. 5 shows an example of a real curve of the ratio of the welding current I to the welding voltage U, i.e. the conductance G, as a function of the time t or welding duration, or number of welds. In contrast to the simplified illustrations according to FIGS. 3 and 4, here the fluctuations of the calculated signal due to the fluctuations of the measurement values of the welding current I and the welding voltage U are clearly visible. For example, the welding current I and the welding voltage U are measured at a sampling frequency $f_A$ from 10 kHz to 100 kHz. By averaging the measured values over a certain time period $\Delta t_M$ of, for example, 1 ms to 300 ms, smoothing of the curve can be achieved. As mentioned above, the measurement of the welding current I and the welding voltage U is preferably carried out at a time when the welding current I has a maximum value $I_{max}$, depending on the welding process. This allows the ratio, i.e. the resistance R or the conductance G, to be determined as accurately as possible.

When the conductance reaches or falls below the first threshold value $G_{S1}$ for the conductance G at time $t_1$, an acoustic, optical and/or tactile warning is issued. When the conductance reaches or falls below the second conductance threshold value $G_{S2}$ at the time $t_2$, a warning is output which is different from the warning issued on falling below the first conductance threshold value $G_{S1}$, or the welding process is even switched off and the contact tube 5 is replaced.

The present invention describes a reliable method for ascertaining the wear of a contact tube during the welding process.

The invention claimed is:

1. A method for determining a wear of a contact tube during a robot-assisted welding method on a workpiece using a welding torch with a consumable welding wire, the method comprising the steps of:
   measuring a welding current,
   measuring a welding voltage,
   dividing the welding current so measured by the welding voltage so measured to calculate a conductance value and comparing the conductance value with at least one defined conductance threshold value,
   or
   dividing the welding voltage so measured by the welding current so measured to calculate a resistance value and comparing the resistance value with at least one defined resistance threshold value, and
   issuing a warning when the conductance value equals the at least one defined conductance threshold value or the resistance value equals the at least one defined resistance threshold value.

2. The method according to claim 1, wherein the steps of measuring the welding current and measuring the welding voltage comprise measuring the welding current and the welding voltage at a time at which the welding current has a maximum value, the time corresponding to an end of a pulse phase of a pulsed process or an end of a short-circuit phase during an arcing phase of a short-circuit-based arc welding process.

3. The method according to claim 1, further comprising the step of averaging the conductance value or the resistance value over time.

4. The method according to claim 1, further comprising a step of setting at least one of the at least one defined conductance threshold value and the at least one defined resistance threshold value.

5. The method according to claim 1, wherein the step of issuing the warning comprises issuing the warning acoustically, optically, and/or in tactile form.

6. The method according to claim 1, further comprising a step of reducing a distance from the welding torch or an end of the contact tube to the workpiece, in an event of the warning being issued, thereby compensating for the wear of the contact tube.

7. The method according to claim 1, further comprising a step of determining a distance from the welding torch or an end of the contact tube to the workpiece.

8. The method according to claim 1, further comprising a step of carrying out a weld on a reference metal plate in an event of the warning being issued.

9. The method according to claim 1, wherein the steps of measuring the welding current and measuring the welding voltage comprise measuring the welding current and the welding voltage at a sampling frequency of 10 KHz to 100 KHz.

10. The method according to claim 1, further comprising a step of averaging the welding current and the welding voltage over a time interval of 1 ms to 300 ms.

11. The method according to claim 1, further comprising a step of recording the conductance value or the resistance value as a function of a time of welding.

* * * * *